United States Patent
Beck et al.

(10) Patent No.: US 8,118,082 B2
(45) Date of Patent: Feb. 21, 2012

(54) HEAT EXCHANGER IN PARTICULAR FOR EXHAUST COOLERS ON INTERNAL COMBUSTION ENGINES

(75) Inventors: Claus Beck, Esslingen (DE); Hervé Palanchon, Ontario (CA); Martin Schindler, München (DE)

(73) Assignee: Behr GmbH & Co. KG, Stuttgart (DE)

( * ) Notice: Subject to any disclaimer, the term of this patent is extended or adjusted under 35 U.S.C. 154(b) by 800 days.

(21) Appl. No.: 11/568,796

(22) PCT Filed: May 4, 2005

(86) PCT No.: PCT/EP2005/004852
§ 371 (c)(1),
(2), (4) Date: Aug. 1, 2007

(87) PCT Pub. No.: WO2005/111386
PCT Pub. Date: Nov. 24, 2005

(65) Prior Publication Data
US 2008/0035309 A1 Feb. 14, 2008

(30) Foreign Application Priority Data

| May 7, 2004 | (DE) | 10 2004 023 319 |
| Jun. 21, 2004 | (DE) | 10 2004 029 863 |
| Aug. 20, 2004 | (DE) | 10 2004 040 667 |
| Aug. 20, 2004 | (DE) | 10 2004 040 668 |

(51) Int. Cl.
*F28F 27/02* (2006.01)
*F02M 25/07* (2006.01)
*F02B 47/08* (2006.01)

(52) U.S. Cl. ............ 165/103; 165/82; 123/568.12

(58) Field of Classification Search .......... 165/103, 165/82; 137/875, 872; 123/568.12
See application file for complete search history.

(56) References Cited

U.S. PATENT DOCUMENTS
55,072 A * 5/1866 Doty ................ 137/875
(Continued)

FOREIGN PATENT DOCUMENTS
DE 199 62 863 A1 6/2001
(Continued)

OTHER PUBLICATIONS
Office Action mailed Feb. 8, 2011 in related Japanese application No. 2007-512018.
(Continued)

*Primary Examiner* — Leonard Leo
(74) *Attorney, Agent, or Firm* — Foley & Lardner LLP

(57) ABSTRACT

The invention relates to a heat exchanger (10), in particular, for exhaust coolers on internal combustion engines. The aim of the invention is to provide a separation of the carrier medium flow into two partial flows as leak free as possible, by suitable embodiment of the baffle plate (40). A heat exchanger (10), as used, in particular, as exhaust gas cooler for internal combustion engines, comprises a heat exchanger channel (14) and a bypass channel (11), whereby a switching flap (20) is arranged upstream of the heat exchanger (10) in the flow channel (25), which divides the incoming carrier medium into the heat exchanger channel (14) and the bypass channel (11). A baffle plate (40) is provided to maintain the separation between the partial flow through the bypass channel (11) and the partial flow through the heat exchanger channel (14), which, according to the invention, extends from the switching flap (20) to the beginning of the bypass channel (11).

7 Claims, 2 Drawing Sheets

U.S. PATENT DOCUMENTS

| | | | |
|---|---|---|---|
| 137,268 A * | 3/1873 | Wetmore | 137/875 |
| 325,449 A * | 9/1885 | Schueler | 137/875 |
| 2,729,158 A | 1/1956 | Wilfert | |
| 4,164,255 A * | 8/1979 | Binet et al. | 165/82 |
| 6,141,961 A | 11/2000 | Rinckel | |
| 6,330,910 B1 | 12/2001 | Bennett | |
| 6,955,213 B2 | 10/2005 | Stonehouse et al. | |
| 7,032,577 B2 | 4/2006 | Rosin et al. | |
| 2003/0033801 A1 | 2/2003 | Hinder et al. | |
| 2003/0192606 A1 | 10/2003 | Heckt | |
| 2004/0251012 A1 | 12/2004 | Bush et al. | |
| 2005/0039729 A1 | 2/2005 | Rosin et al. | |
| 2005/0199381 A1 | 9/2005 | Mercz et al. | |
| 2006/0162706 A1 | 7/2006 | Rosin et al. | |

FOREIGN PATENT DOCUMENTS

| | | |
|---|---|---|
| DE | 100 25 877 A1 | 12/2001 |
| DE | 201 21 018 U1 | 5/2002 |
| DE | 102 03 003 A1 | 8/2003 |
| DE | 102 28 619 A1 | 1/2004 |
| DE | 103 03 910 A1 | 8/2004 |
| DE | 10346250 A1 | 5/2005 |
| EP | 0942156 A1 | 9/1999 |
| EP | 0987427 A1 | 3/2000 |
| EP | 1273786 A2 | 1/2003 |
| EP | 1288603 A2 | 3/2003 |
| EP | 1 363 013 A1 | 11/2003 |
| EP | 1367253 A1 | 12/2003 |
| JP | 2001-165000 A | 6/2001 |
| JP | 2003-113742 A | 4/2003 |
| JP | 2003-278609 A | 10/2003 |
| JP | 2004076587 | 3/2004 |
| JP | 2004-124809 A | 4/2004 |
| WO | WO 02/10574 A1 | 2/2002 |
| WO | WO 03/062625 A1 | 7/2003 |
| WO | WO 03/085252 A2 | 10/2003 |
| WO | WO 03/098026 A1 | 11/2003 |

OTHER PUBLICATIONS

Office Action mailed Feb. 8, 2011 in related Japanese Application No. 2007-512020 (7 pages).

* cited by examiner

HEAT EXCHANGER IN PARTICULAR FOR EXHAUST COOLERS ON INTERNAL COMBUSTION ENGINES

The invention relates to a heat exchanger, in particular for exhaust gas coolers of internal combustion engines.

Heat exchangers are known for various applications. It is additionally also known to provide a so-called bypass duct which conducts the carrier medium, which flows through the heat exchanger, past the heat exchanger body. The carrier medium then passes the heat exchanger without a significant exchange of energy taking place with the carrier medium, whereas when said carrier medium flows through the heat exchanger region, energy is transferred to a heat exchanger medium or is transmitted from the latter to the carrier medium.

To regulate or control the resulting carrier medium temperature downstream of the heat exchanger, it is known to arrange a switching flap upstream of the heat exchanger in the flow duct which leads to the heat exchanger, said switching flap dividing the carrier medium flowing to it into variable partial flows, one of which passes through the heat exchanger duct and the other of which passes through the bypass duct. The resulting mixture temperature downstream of the heat exchanger is determined by setting, by means of the flap, the relative proportion of the volume flow through the bypass duct relative to the volume flow through the heat exchanger duct.

A separating plate is provided to keep the partial flows separate in the region between the switching flap and the start of the bypass duct.

A frequent problem with separating plates of said type is the leakage flow which results in the region of the separating plate and at the transition from the separating plates to the heat exchanger duct and to the bypass duct.

It is an object of the invention to allow the carrier medium flow to be divided into two partial flows, with the least possible leakage flow, by means of a suitable design of the separating plate.

Said object is achieved by means of a heat exchanger according to the invention.

A heat exchanger, as can be used in particular as an exhaust gas cooler of internal combustion engines, has a heat exchanger duct and a bypass duct, a switching flap being arranged in the flow duct upstream or downstream of the heat exchanger, said switching flap dividing the carrier medium flowing to it between the heat exchanger duct and the bypass duct. To maintain the separation between the partial flow through the bypass duct and the partial flow through the heat exchanger duct, a separating plate is provided which, according to the invention, extends from the switching flap to the start of the bypass duct.

Good separation of the two partial flows is obtained, and relatively large leakage flows between the two partial flows are largely prevented, by virtue of the separating plate extending into the start of the bypass duct. Said approach allows precise separation of the two partial flows into their ratio relative to one another, and therefore allows good regulation or control of the temperature of the carrier medium downstream of the heat exchanger. In the heat exchanger duct of a heat exchanger, energy carrier medium is transferred to the heat exchanger medium, which is placed in heat transmitting contact with the carrier medium by means of an exchange surface in the region of the heat exchanger duct, or else is transferred from said heat exchanger medium to the carrier medium. Here, the exchange of energy in the region of the heat exchanger duct is predefined by the different energy contents of the carrier medium and heat exchanger medium. A good mixture temperature can be generated downstream of the heat exchanger, while at the same time preventing leakage flows which have an incalculable effect on the partial flows, as a result of the variable alteration of the proportions of the two partial flows, so that the thermal energy of the carrier medium downstream of the heat exchanger can be controlled or regulated. Leakage flows are prevented because, in the embodiment according to the invention, the separating plate extends to the start of the bypass duct. There are therefore no gaps between the bypass duct and the separating plate, so that, in contrast to conventional solutions, resulting leakage flows can be avoided in said region.

According to a preferred embodiment of the invention, the separating plate is connected, in particular welded, to the bypass duct. The connection between the separating plate and the bypass duct ensures that leakage flows are prevented between the separating plate and the start of the bypass duct, and good and reliable separation of the partial flows is therefore ensured.

According to a further advantageous embodiment of the invention, a diffuser is formed, as a constituent part of the heat exchanger, between the flow duct and the start of the bypass duct and of the heat exchanger duct, with the separating plate being connected to the diffuser at least in regions. The purpose of the diffuser is to provide a transition, which is favorable in terms of flow, between the flow duct with its small flow cross section and the heat exchanger with the relatively large flow cross section. The increased flow cross section in the region of the heat exchanger, in particular in the region of the heat exchanger duct, makes it possible to conduct the same volume flow rate through at a lower flow speed. The reduced flow speed increases the possibility of an exchange of energy between the carrier medium and the heat exchanger medium in the region of the heat exchanger duct. The connection, at least in regions, of the separating plate to the diffuser also provides improved impermeability and therefore a reduced leakage flow between the two partial flows generated by the switching flap. Here, the separating plate is in contact with the diffuser in particular in side sections relative to the flow through the diffuser, with a connection being produced between the separating plate and the diffuser in particular in said region of contact, said connection being formed in particular as a welded connection.

According to a preferred embodiment of the invention, the switching flap is held on a pivot axle in the flow duct, the flap face of the switching flap extending upstream of the pivot axle, and the separating plate extending to the pivot axle and in particular being connected thereto. This measure also serves to form a duct, which is free of gaps and leaks, leading from the end of the switching flap into the bypass duct of the heat exchanger.

According to a preferred embodiment of the invention, the bypass duct comprises two tubes, specifically an outer tube and an inner tube, which are arranged one inside the other, with carrier medium flowing through the inside, that is to say the core, of the inner tube, said carrier medium being conducted past the heat exchanger duct in this way.

On the one hand, the measure of providing a dual tube with an inner tube and an outer tube provides the facility for arranging the inner tube in the bypass duct so as to permit thermal length play. As a result of said measure, the thermal expansion of the inner tube as a result of the carrier medium flowing through it can be compensated for, and is made possible by means of corresponding play and loose retention of one tube in the interior of the other.

According to a preferred embodiment, the separating plate extends into the inner tube. As a result of said measure, a transfer of the parting flow which is to flow through the bypass duct is guided without leakage to the inner tube, and therefore to the start of the flow duct. In a further embodiment, it is provided in particular that the inner tube is held on or fastened to, in particular welded to, the separating plate in a guided fashion. This measure initially ensures that the separating plate and the inner tube remain in permanent contact with one another, and leakage flows cannot occur at this point. In addition, improved internal impermeability is obtained between the cooler and the bypass line, and tolerance problems between the separating plate and the cooler are prevented. Tolerance and position compensation problems are also prevented by virtue of a fixed connection being provided between the separating plate and the inner tube.

According to a particularly advantageous further embodiment of the invention, the separating plate is offset so as to form an end wall which is aligned vertically relative to the throughflow direction. The end wall has an aperture into which the inner tube opens out, with the aperture and inner tube having mutually corresponding contours in said section, and being connected, in particular welded, to one another in said region in such a way that the aperture forms the inflow opening for the interior of the inner tube.

Said embodiment ensures that the complete partial flow is guided into the inner tube, and that a good transition, which is favorable in terms of manufacture, is provided between the flow duct and the inner tube of the bypass duct. Here, it is possible in particular for the separating plate to be directly held on or fastened to the inner tube and thus to be mounted on sides of the heat exchanger, and not on the switching flap, during assembly. The separating plate can therefore serve simultaneously to maintain the position of the inner tube in the heat exchanger, and in addition, a narrow gap for compensating for instances of length play in the region directly downstream of the pivot axle of the switching flap is relatively insignificant, since said gap is situated in the flow shadow of the axle structure and therefore only a smaller leakage flow occurs than in the regions in which the separating plate acts so as to guide flow and deflect flow and guide the flow into the inner tube of the bypass duct. It can also in particular be provided that the inner tube is held in a guided fashion in the aperture without any positionally fixed fastening, but with a type of bearing, so that the inner tube is held in the aperture so as to be axially displaceable in the event of thermal expansion.

According to a further preferred embodiment of the invention, it is provided that the end wall adjoins the diffuser at least over a partial region of the latter, and is preferably connected, in particular welded, to the diffuser in said region of contact. As a result of this measure, a favorable retaining arrangement for the separating plate is provided, and at the same time, the inner tube of the bypass duct is reliably held and guided in a defined position.

The invention is otherwise explained in more detail in the following and on the basis of the exemplary embodiment illustrated in the drawing, in which.

Figure 1:
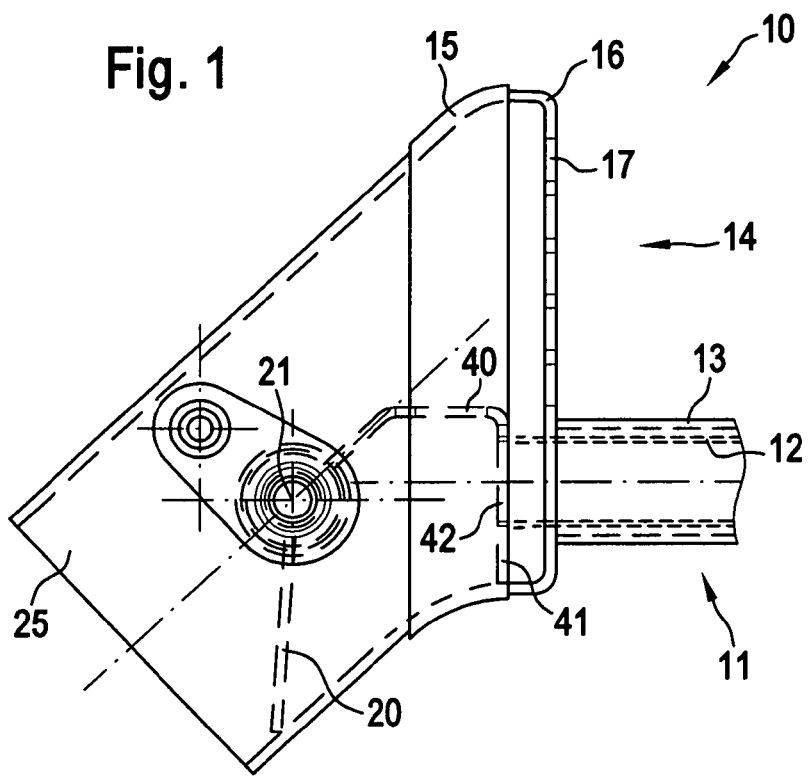
FIG. 1 shows a section in the longitudinal direction through a flow duct and a heat exchanger in the region of a separating plate.
Figure 2:
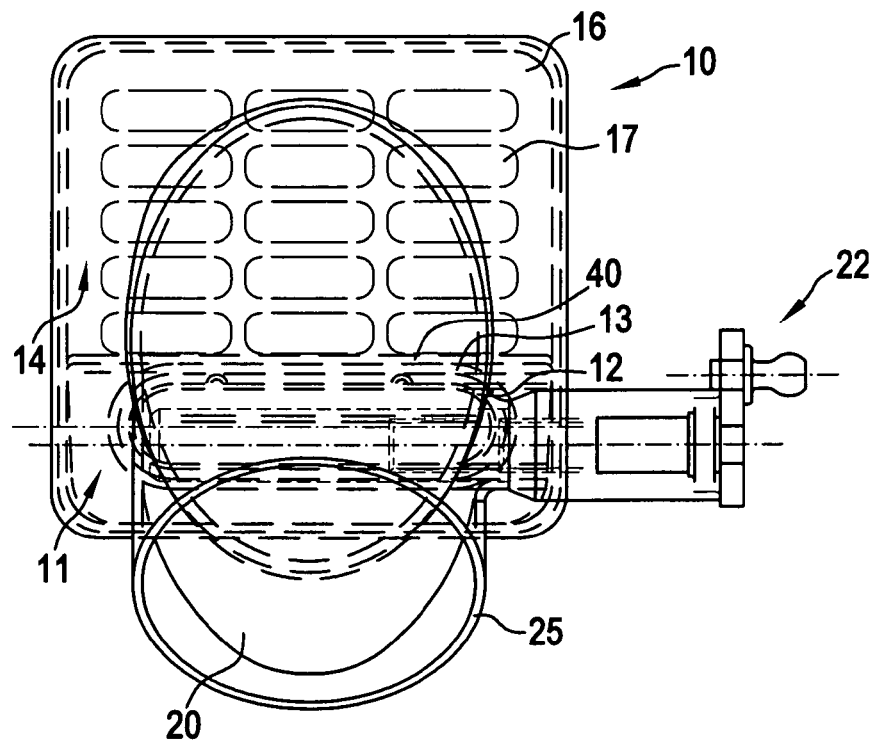
FIG. 2 illustrates a section in the transverse direction through that shown in FIG. 1.

FIGS. 1 and 2 illustrate a longitudinal section and a transverse section through the flow guide of the carrier medium in the inflow region upstream of a heat exchanger (10). The heat exchanger (10) is formed to have two channels, one of the two channels forming the bypass duct (11) and the other channel forming the heat exchanger duct (14). Here, the heat exchanger duct (14) is embodied so as to allow an exchange of energy between the carrier medium and a heat exchanger medium which is in energy-exchanging contact with the carrier medium in the region of the heat exchanger duct (14), and therefore to allow the carrier medium to be heated or cooled. In the illustrated exemplary embodiment, the heat exchanger is an exhaust gas cooler for internal combustion engines, in which the carrier medium is formed by the exhaust gas flow and, accordingly, cooling water is provided as the heat exchanger medium. Here, heat energy is transmitted from the carrier medium, exhaust gas, to the heat exchanger medium, water, and the temperature of the exhaust gas flow is therefore reduced.

The exhaust gas, that is to say carrier medium, guided through the bypass duct (11) passes to the downstream end of the heat exchanger with approximately no change in temperature taking place. The temperature of the exhaust gas flow downstream of the heat exchanger can be controlled or regulated by setting the proportion of partial flow which flows through the heat exchanger in the bypass duct and which flows through the heat exchanger duct, and a subsequent mixture of the two partial flows.

The switching flap (20) serves to divide the exhaust gas flowing in into the two partial flows, said switching flap (20) being held, so as to be adjustable in terms of position by means of an actuating device (22) (only partially illustrated), in the flow duct (25) which leads to the heat exchanger (10), said flow duct (25) being defined by a tube. In the two figures, the switching flap (20) is shown in the position in which the entire exhaust gas flow is conducted into the heat exchanger duct and in which no partial flow is guided through the bypass duct (11).

The bypass duct (11) is formed by one single tube or two tubes which are guided one inside the other. The outer tube (13) surrounds an inner tube (12), with that partial flow of exhaust gas which flows through the bypass duct being conducted through the core, that is to say middle, of said inner tube (12). An insulating gap is provided between the two tubes as a result of said measure.

The diffuser (15) forms the flow transition between the flow duct (25) and the heat exchanger (10), which has a larger traversable cross section than the flow duct (25). In the region of the heat exchanger duct (14), the diffuser is delimited by a base (16) in which the ducts (17), which form that region of the heat exchanger duct (14) through which carrier medium can flow, open out. In the region outside the heat exchanger duct, the outer tube (13) of the bypass duct (11) opens out in the base (16) which has a corresponding aperture. The inner tube (12) of the heat exchanger duct extends through the base (16), said inner tube (12) projecting into the diffuser (15).

In order to separate the two partial flows, which are generated by the flap (20) from the exhaust gas flow flowing to it, from one another, the separating plate (40) is arranged in the diffuser (15), said separating plate (40) extending to the pivot axle (21) in the flow duct (25). Here, the separating plate (40) in the diffuser (15) bears at the side against the side wall, and is preferably welded to the latter. In addition, said separating plate (40) has an aperture (42) which is situated in an end wall (41) which extends perpendicular to the throughflow direction and is part of the separating plate (40). The inner tube (12) of the bypass duct (11) projects into said aperture (42), so that either a fixed connection between the separating plate (40) and the inner tube (12) is produced by means of welding, or else a connection, which is substantially fluid-tight yet allows thermal length compensation by means of axial displacement of the inner tube (12), between the separating plate (40) and the bypass duct (11) is produced by means of guided retention of the inner tube (12) in the aperture (42).

Here, the separating plate (40) extends into the flow duct (25) and also bears against the latter at the side go as to prevent an auxiliary flow of exhaust gas or carrier medium supplied for the partial flows past the separating plate (40) and between the two channels which are separated from one another by the separating plate (40). The separating plate (40) extends to the pivot axle (21) and is in contact with the axle guide or with an axle casing which surrounds the pivotable axle with the switching flap (20) at least in regions. A fastening, in particular a plug-type welding flux connection, can be provided between the separating plate (40) and the pivot axle (21) in said region of contact.

Figure 3:
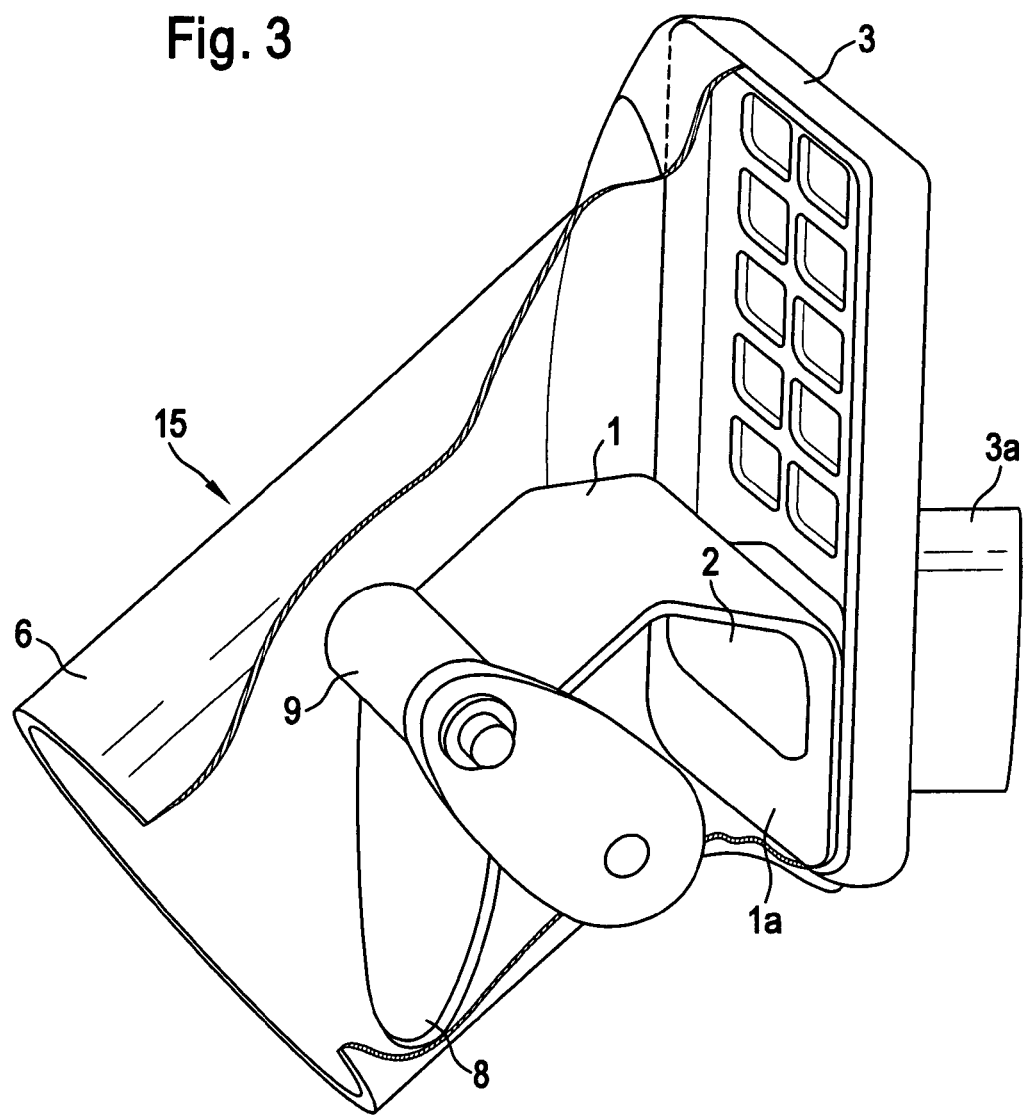
FIG. 3 shows an oblique view of a flow duct and a heat exchanger.

FIG. 3 shows an oblique view of a valve duct. A guide plate 1 comprises an angled edge 1*a* with an aperture which is matched to the cross section of the inner tube 2. The guide plate 1 is initially welded to an end side of the inner tube 2 around the edge of the aperture. Said unit is then inserted into the passage 3*a* of the housing 3, with good frictionally locking retention of the inner tube being provided for example by means of knobs. The inner tube and/or the guide plate 1 are/is subsequently welded to the housing, with one spot weld being sufficient if appropriate.

The valve duct 6 is then placed over the guide plate 1, and the valve flap 8 and the shaft 9 are assembled if appropriate. Once the valve duct 6 has been aligned more precisely relative to the valve element 15, the valve duct 6 is welded to the housing by means of a weld seal running around the end side of the housing.

Depending on requirements, the respective special features of the exemplary embodiments described are not restricted to said exemplary embodiments, but can be freely combined with one another, it being possible if appropriate to form particularly advantageous heat exchangers by means of certain combinations.

The invention claimed is:

1. A heat exchanger for an exhaust gas cooler of an internal combustion engine, comprising:
   a heat exchanger duct;
   a bypass duct; and
   a switching flap arranged in a flow duct upstream or downstream of the heat exchanger, said switching flap dividing a carrier medium flowing to the switching flap between the heat exchanger duct and the bypass duct, and said switching flap adjoined to a separating plate configured to separate the two partial flows,
   wherein the separating plate extends to a start of the bypass duct,
   wherein the bypass duct consists of two tubes, an outer tube and an inner tube, which are arranged one inside the other, the carrier medium flowing through a core of the inner tube,
   wherein the inner tube extends to the separating plate and is connected to the separating plate, and
   wherein the separating plate forms an end wall, which is aligned vertically relative to the flow direction, and includes an aperture into which the inner tube terminates,
   wherein the outer tube is separated from the end wall of the separating plate such that there is a space between the outer tube and the end wall in an axial direction of the heat exchanger.

2. The heat exchanger as claimed in claim 1, wherein the separating plate is connected to the bypass duct.

3. The heat exchanger as claimed in claim 1, wherein a diffuser is fixated between the flow duct and the start of the bypass duct, the separating plate being connected to the diffuser at least in regions.

4. The heat exchanger as claimed in claim 3, wherein the end wall is in contact with the diffuser at least over a partial region of the latter, and is connected to said diffuser in a region of contact.

5. The heat exchanger as claimed in claim 1, wherein the switching flap is held on a pivot axle in the flow duct, the separating plate extending to the pivot axle and fastened to the pivot axle.

6. The heat exchanger as claimed in claim 1, wherein the inner tube is held in the aperture in an axially displaceably guided fashion.

7. The heat exchanger as claimed in claim 1, wherein the inner tube is connected to the end wall of the separating plate in a region of the aperture.

* * * * *